United States Patent
Burton et al.

(10) Patent No.: US 12,019,057 B2
(45) Date of Patent: Jun. 25, 2024

(54) PEAK INTEGRATION CORRECTION WITHOUT PARAMETER ADJUSTMENT

(71) Applicant: DH TECHNOLOGIES DEVELOPMENT PTE. LTD., Singapore (SG)

(72) Inventors: Lyle Lorrence Burton, Woodbridge (CA); Stephen Alexander Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 268 days.

(21) Appl. No.: 17/593,109

(22) PCT Filed: Jun. 10, 2020

(86) PCT No.: PCT/IB2020/055465
§ 371 (c)(1),
(2) Date: Sep. 9, 2021

(87) PCT Pub. No.: WO2020/250158
PCT Pub. Date: Dec. 17, 2020

(65) Prior Publication Data
US 2022/0187259 A1   Jun. 16, 2022

Related U.S. Application Data

(60) Provisional application No. 62/860,310, filed on Jun. 12, 2019.

(51) Int. Cl.
*G01N 30/86* (2006.01)
*G01N 30/02* (2006.01)
(Continued)

(52) U.S. Cl.
CPC ......... *G01N 30/8631* (2013.01); *G01N 30/14* (2013.01); *G01N 30/7233* (2013.01); *G01N 2030/027* (2013.01)

(58) Field of Classification Search
CPC ............... G01N 30/8631; G01N 30/14; G01N 30/7233; G01N 2030/027; G01N 30/8624;
(Continued)

(56) References Cited

U.S. PATENT DOCUMENTS

2013/0131998 A1*  5/2013  Wright .................... G06F 19/00
                                                                    702/27
2015/0380225 A1   12/2015  Yamada

FOREIGN PATENT DOCUMENTS

JP    07-103959 A    4/1995
JP    09-054071 A    2/1997
(Continued)

OTHER PUBLICATIONS

International Search Report and Written Opinion for PCT/IB2020/055465, dated Sep. 16, 2020.
(Continued)

*Primary Examiner* — Eric S. McCall
*Assistant Examiner* — Timothy P Graves

(57) ABSTRACT

A separation device is instructed to separate a compound from a sample over a time period. A mass spectrometer is instructed to measure a plurality of intensities of at least one ion of the separated compound over the time period, producing a chromatogram. At least one peak of the at least one ion is identified from the chromatogram using a peak-finding algorithm. Two or more different peak integration areas are calculated for the at least one peak by applying the peak-finding algorithm with two or more different values for at least one peak-finding parameter. Two or more plots of the at least one peak that each shows graphically a different peak integration area are displayed on a display device at the same
(Continued)

time. In response, data is received from a user selection device that indicates user selection of one of the two or more plots.

13 Claims, 10 Drawing Sheets

(51) Int. Cl.
    *G01N 30/14*     (2006.01)
    *G01N 30/72*     (2006.01)

(58) Field of Classification Search
    CPC .... G01N 30/8606; G01N 30/02; G01N 30/72; G01N 30/86; H01J 49/0036; H01J 49/004
    See application file for complete search history.

(56) References Cited

FOREIGN PATENT DOCUMENTS

| | | |
|---|---|---|
| JP | 2014-211393 A | 11/2014 |
| WO | 2018229811 A1 | 12/2018 |

OTHER PUBLICATIONS

Pirok, B. W. J. et al. 'Peak-Tracking Algorithm for Use in Automated Interpretive Method-Development Tools in Liquid Chromatography', Analytical chemistry, Nov. 2018, vol. 90, No. 23, pp. 14011-14019.

\* cited by examiner

PEAK INTEGRATION CORRECTION WITHOUT PARAMETER ADJUSTMENT

RELATED APPLICATIONS

This application claims the benefit of U.S. Provisional Patent Application Ser. No. 62/860,310, filed on Jun. 12, 2019 the content of which is incorporated by reference herein in its entirety.

INTRODUCTION

The teachings herein relate to apparatus and methods for peak integration in chromatography systems, including, but not limited to, liquid chromatography (LC) and gas chromatography (GC). More specifically, two or more integration areas for a chromatographic peak are displayed to a user at the same time, and the user is allowed to select the preferred integration area. This method decreases the time it takes to review and select the proper integration area of a chromatographic peak. This method is independent of the detection system used (mass spectrometry (MS), ultraviolet (UV), etc.).

The apparatus and methods disclosed herein can be performed in conjunction with a processor, controller, microcontroller, or computer system, such as the computer system of FIG. 1.

Mass Spectrometry Background

Mass spectrometry (MS) is an analytical technique for detection and quantitation of chemical compounds based on the analysis of m/z values of ions formed from those compounds. MS involves ionization of one or more compounds of interest from a sample, producing precursor ions, and mass analysis of the precursor ions.

Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Mass spectrometers are often coupled with chromatography or other separation systems in order to identify and characterize eluting compounds of interest from a sample. In such a coupled system, the compounds in the eluting solvent are ionized and a series of mass spectra are obtained at specified time intervals. These times range from, for example, 1 second to 100 minutes or greater. Intensity values derived from the series of mass spectra form a chromatogram. For example, the sum of all intensities generates a Total Ion Chromatogram (TIC) and the intensity of one mass value generates an extracted ion chromatogram (XIC).

Peaks found in the chromatograms are used to identify or characterize a known peptide or compound in the sample because they elute at known times called retention times. More particularly, the retention times of peaks and/or the area of peaks are used to identify or characterize (quantify) a known peptide or compound in the sample.

In traditional separation coupled mass spectrometry systems, a precursor ion of a known compound is selected for analysis. An MS/MS scan is then performed at each interval of the separation for a mass range that includes the precursor ion. The intensity of the product ions found in each MS/MS scan is collected over time and analyzed as a collection of spectra, or an XIC, for example.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Separation Device Background

As described above, mass spectrometers are often coupled with separation systems or devices in order to identify and characterize eluting compounds of interest from a sample. Such separation devices can include, but are not limited to, liquid chromatography (LC) devices, gas chromatography devices, capillary electrophoresis devices, or ion mobility devices. LC devices are commonly in conjunction with mass spectrometers to quantify the amount of a compound of interest in a sample.

FIG. 2 is an exemplary diagram of an LC device 200 for a mass spectrometer. LC device 200 includes two separate devices. It includes high-performance liquid chromatography (HPLC) device 210 and direct infusion or injection device 220.

In HPLC device 210, one of two solvents 211 or 212 is selected using valve 215. Solvents 211 or 212 are moved to valve 215 using pumps 213 and 214, respectively. Sample 216 is mixed with the selected solvent using mixer 217, and the resulting mixture is sent through liquid chromatography (LC) column 218. Sample 216 is selected using autosampler 219, for example.

In direct infusion or injection device 220, a sample is already mixed with a solvent in fluidic pump 221. Fluidic pump 221 is shown as a syringe pump but can be any type of pump.

The use of HPLC device 210 or direct infusion or injection device 220 is selected using valve 230. The selected mixture or mobile phase composition is sent over time from valve 230 to an ion source (not shown) of a mass spectrometer (not shown).

Chromatographic Peak Integration Problem

As described above, the result of separation coupled mass spectrometry experiments is generally a TIC or XIC. These chromatograms are essentially a collection of intensities that are a function of time. Chromatograms are often used to determine the quantity of a particular compound that is present in a sample. In order to quantify or quantitate a compound, either a precursor ion or product ion peak in a chromatogram is integrated. Integration of a peak generally refers to finding the area under the peak in the chromatogram.

For all quantitative work involving chromatographic peak integration, the accuracy of the peak-finding within the chromatogram is important. For many application areas (pharma, clinical, etc.) this is especially true, and users conventionally manually review all chromatograms correcting any that are not sufficiently well integrated. Peaks are routinely re-integrated even when the total peak area difference may not seem particularly large to someone not skilled in the art.

In all existing separation coupled mass spectrometry software, the review process consists of visually inspecting a set of chromatograms and the corresponding default peak integration (along with the default peak-finding parameters). When not satisfied with a default integration, users adjust the peak-finding parameters, apply the new values, and visually observe the result. This process is repeated until the user is satisfied. In some cases, users essentially give up—either at the beginning or after a few failed attempts at changing the parameters—and manually draw a peak baseline. However, certain labs do not allow such fully manual integrations (it is considered too subjective) and users must continue to adjust the parameters. A peak baseline is essentially a boundary of the area at the base of the peak.

FIG. 3 is an exemplary interactive table 300 that is displayed to a user by a peak-finding algorithm and shows the peak-finding parameters used by the peak-finding algorithm to integrate a peak. Table 300 is generated by one of the peak-finding algorithms of SCIEX, for example. Note that Table 300 allows a user to change the parameters to re-integrate a specific peak.

FIG. 4 is an exemplary plot 400 of a chromatographic peak that is displayed to a user by a peak-finding algorithm and shows the correct integration of the chromatographic peak according to the parameters of FIG. 3. Using the parameters of FIG. 3, the peak-finding algorithm applies peak baseline 411 to integrate, or find the area under, peak 410. Note that peak baseline 411 has vertical and horizontal components. The vertical component of peak baseline 411 separates the area of peak 410 from interfering peak 420. Also note that peak baseline 411 is shown as vertical and horizontal lines. In some embodiments and for some algorithms, the baseline may be a curve. For example, the baseline may be a curve that follows peak 420 to more accurately subtract its contribution.

FIG. 5 is an exemplary plot 500 of a chromatographic peak that is displayed to a user by a peak-finding algorithm and shows the incorrect integration of the chromatographic peak according to the parameters of FIG. 3. Using the parameters of FIG. 3, the peak-finding algorithm applies peak baseline 511 to integrate, or find the area under, peak 510. In FIG. 5, peak 510 is incorrectly integrated because the integration includes contributions from interfering peak 520. In other words, the applied peak baseline 511 does not exclude contributions from interfering peak 520. In order to correct this integration, a skilled reviewer would change one or more parameters of FIG. 3 to re-integrate peak 520 of FIG. 5. Unfortunately, this is an iterative and manual process according to the procedures used by current peak-finding algorithms.

As a result, a fundamental problem with procedures used by current peak-finding algorithms is that it takes too much time to re-integrate an incorrect peak. More specifically, the iterative adjustment of peak-finding parameters for incorrectly integrated peaks takes too much time. This is especially true since it is often not immediately clear which of the peak-finding parameters to adjust and by how much.

Also, well trained, experienced analysts are usually able to perform the correction with reasonable efficiency, but this is far from the case for novices. In fact, beyond the actual time required, perhaps an even bigger problem is user frustration as they struggle to find a set of parameters that will integrate in the desired way.

As a result, additional systems and methods are needed to decrease the time it takes to review and select the proper integration of a chromatographic peak and to select the proper integration without expert knowledge about peak-finding parameters of one or more peak finding algorithms.

SUMMARY

A system, method, and computer program product are disclosed for selecting an integration area for a chromatographic peak. The apparatus includes a separation device, a mass spectrometer, a display device, a user selection device, and a processor.

The processor instructs the separation device to separate a compound from a sample over a time period. The processor instructs the mass spectrometer to measure a plurality of intensities of at least one ion of the separated compound over the time period, producing a chromatogram. The processor identifies at least one peak of the at least one ion from the chromatogram using a peak-finding algorithm. The processor calculates two or more different peak integration areas for the at least one peak also using the peak-finding algorithm by applying the peak-finding algorithm with two or more different values for at least one peak-finding parameter. The processor displays on the display device at the same time two or more plots of the at least one peak that each shows a different peak integration area of the two or more different peak integration areas graphically. In response, the processor receives data from the user selection device that indicates user selection of one of the two or more plots.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
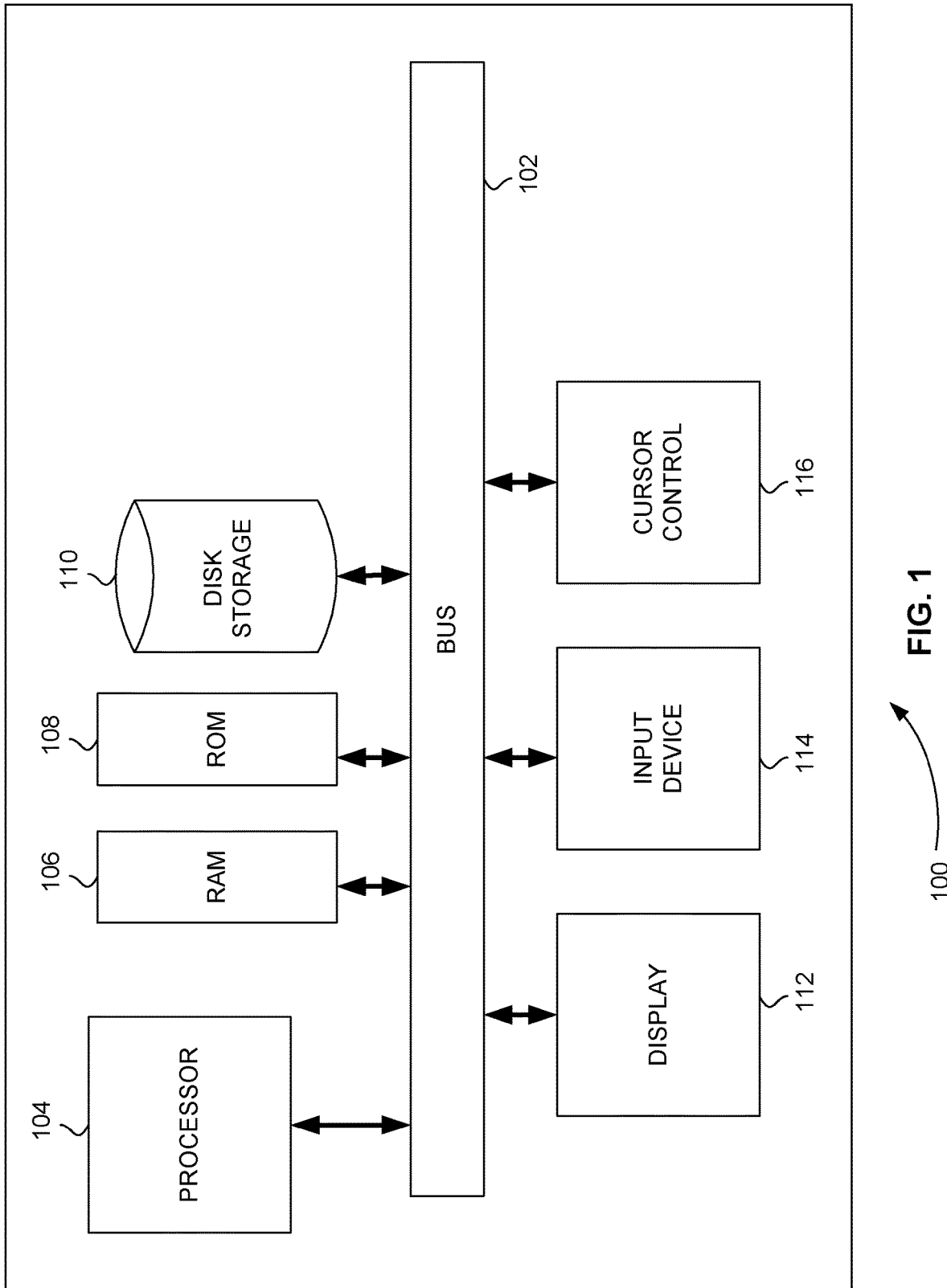
FIG. 1 is a block diagram that illustrates a computer system, upon which embodiments of the present teachings may be implemented.
Figure 2:
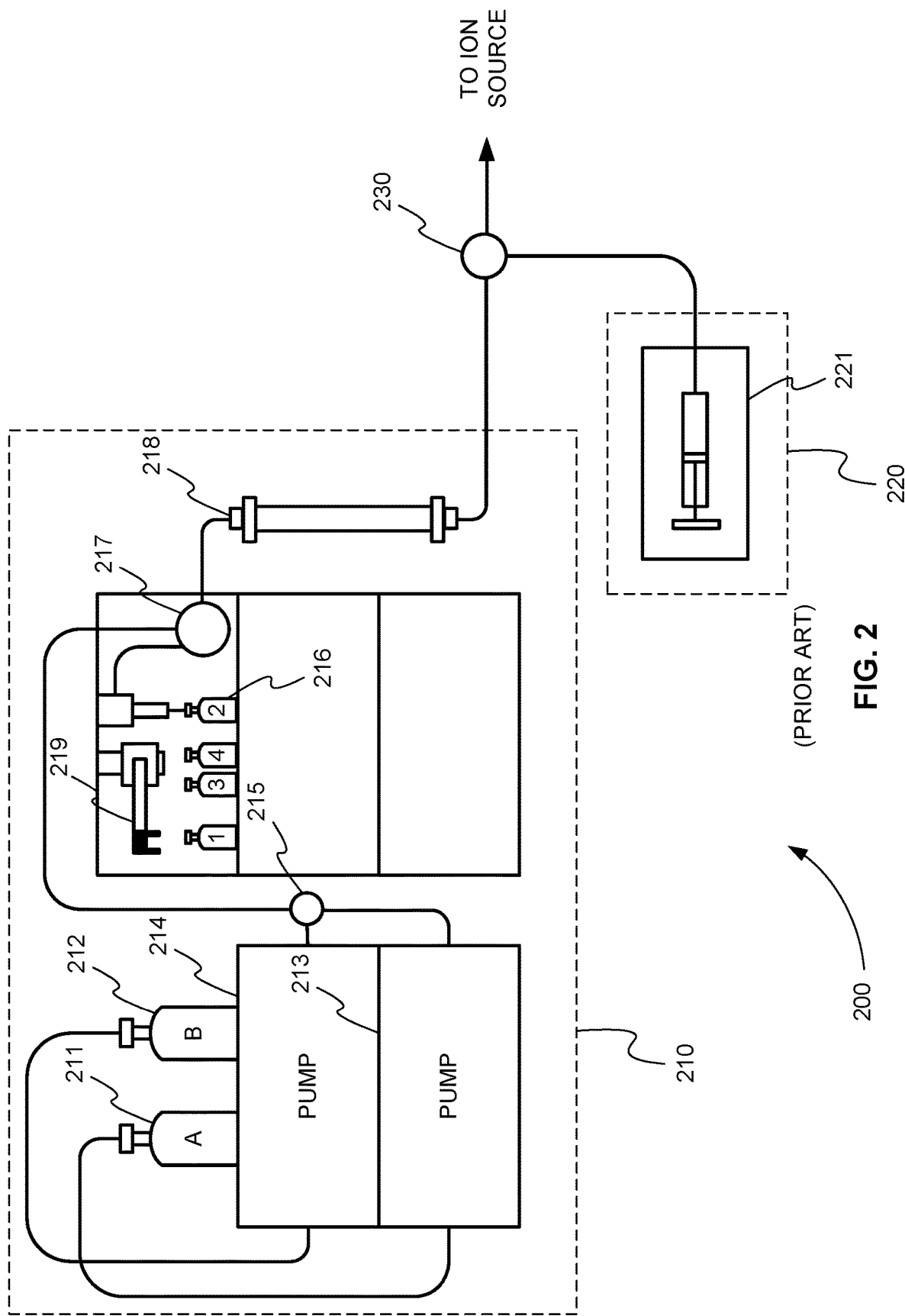
FIG. 2 is an exemplary diagram of an LC device for a mass spectrometer.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Display of Multiple Chromatographic Peak Integrations

As described above, a fundamental problem with procedures used by current peak-finding algorithms is that it takes too much time to re-integrate an incorrectly integrated peak. More specifically, the manual and iterative adjustment of peak-finding parameters for incorrectly integrated peaks takes too much time. Also, well trained, experienced analysts are usually able to perform the correction with reasonable efficiency, but this is far from the case for novices.

As a result, additional systems and methods are needed to decrease the time it takes to review and select the proper integration of a chromatographic peak and to select the proper integration without expert knowledge about peak-finding parameters of one or more peak finding algorithms.

In various embodiments, multiple different possible peak integrations are displayed to a user at the same time, and the user is allowed to select the preferred one. This method decreases the time it takes to review and select the proper integration of a chromatographic peak by reducing the number of iterations. Essentially, many different integrations are generated in just one iteration.

This method also allows the selection of the proper integration without requiring expert knowledge about peak-finding parameters of a specific peak-finding algorithm. Peak-finding parameter values are still adjusted among the multiple different possible peak integrations. However, they are adjusted automatically. The user only needs to visually inspect the areas of the multiple displayed peaks and select the best-plotted integration graphic to select the correct peak-finding parameters of a peak.

Figure 5:
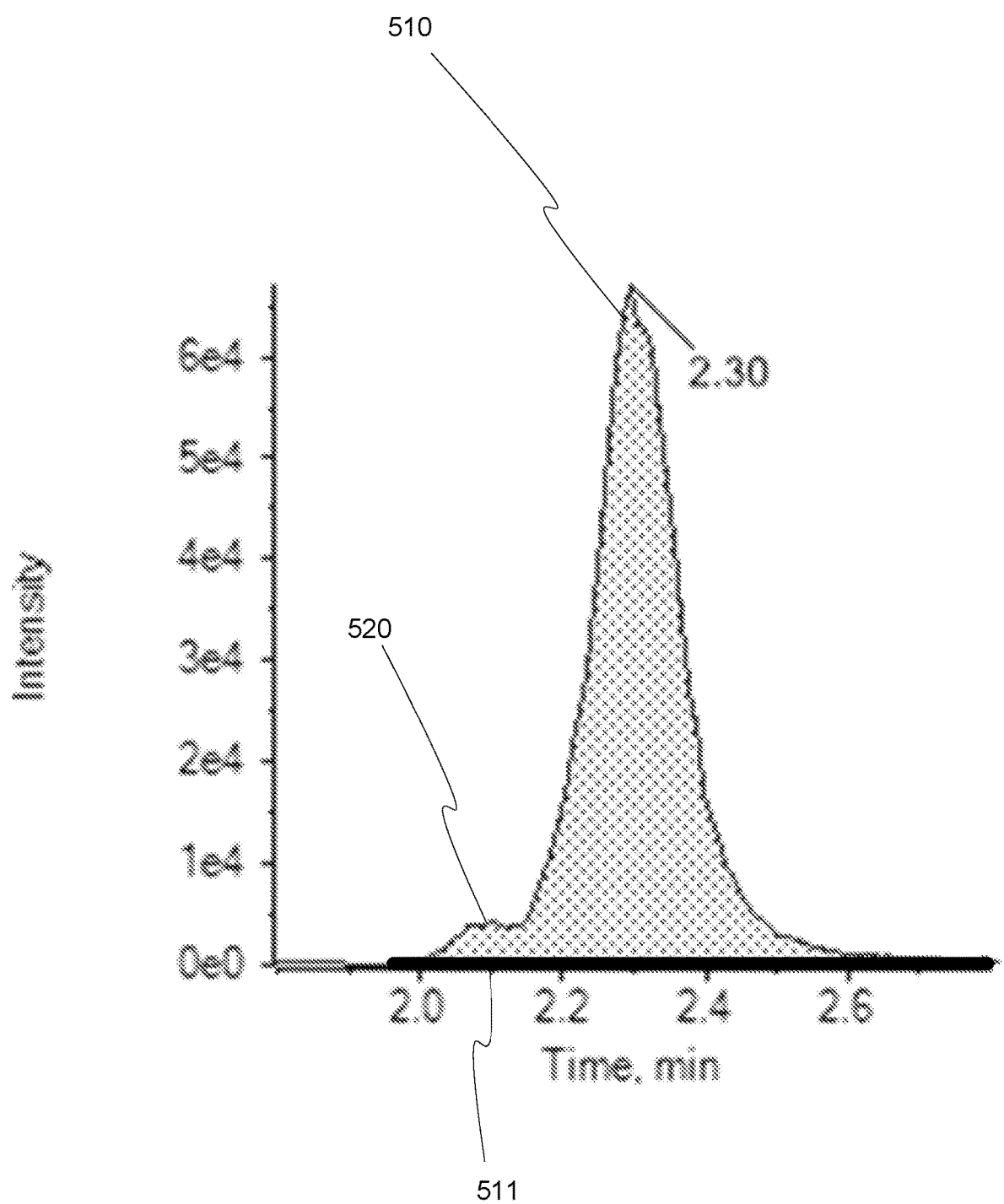
FIG. 5 is an exemplary plot of a chromatographic peak that is displayed to a user by a peak-finding algorithm and shows the incorrect integration of the chromatographic peak according the parameters of FIG. 3.
Figure 6:
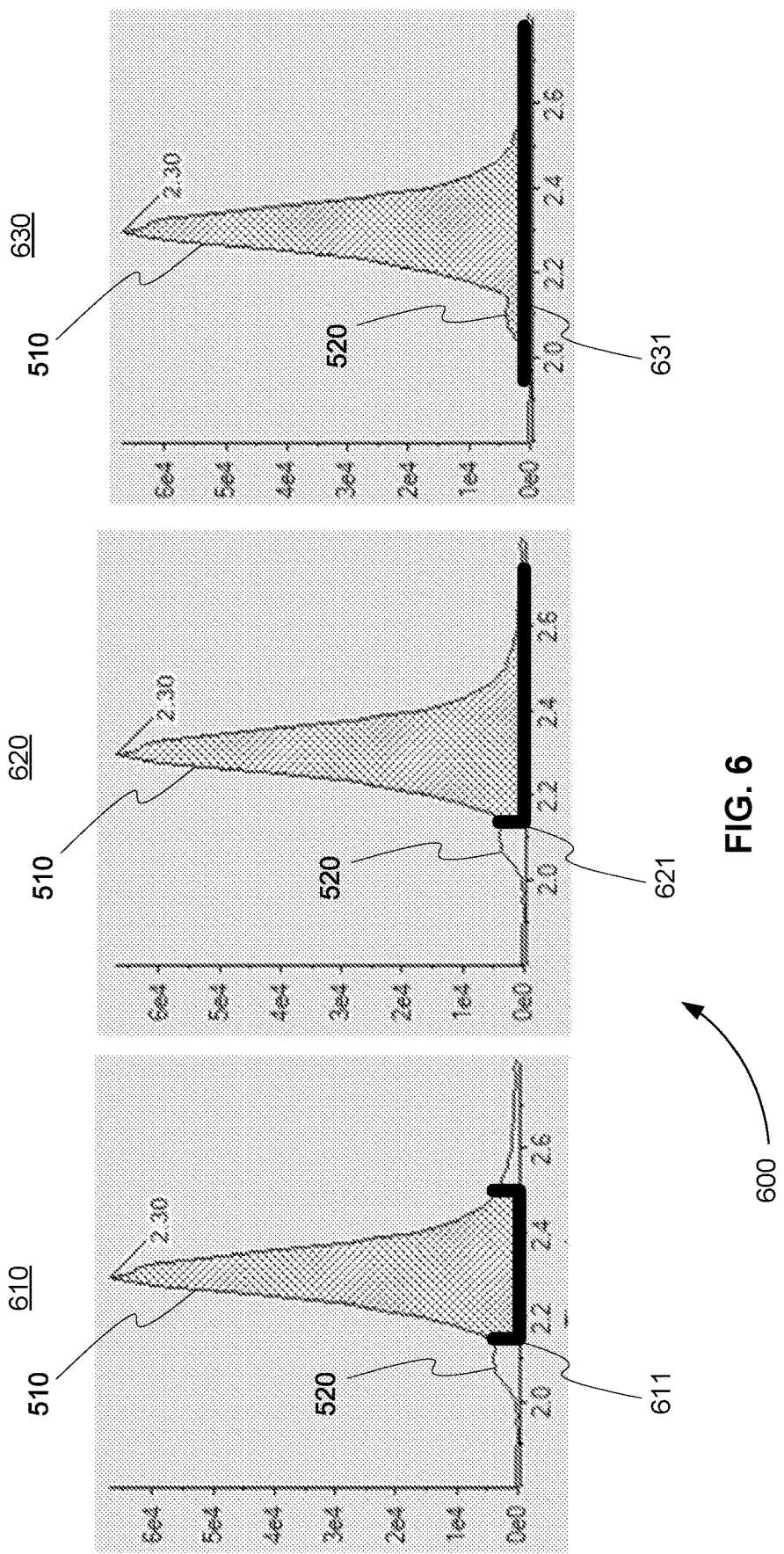
FIG. 6 is an exemplary display of three different possible integrations of the same peak shown in FIG. 5 that allows a user to review multiple integrations at the same time and select a particular integration without requiring expert knowledge about peak-finding parameters of a specific peak-finding algorithm, in accordance with various embodiments.

FIG. 6 is an exemplary display 600 of three different possible integrations of the same peak shown in FIG. 5 that allows a user to review multiple integrations at the same time and select a particular integration without requiring expert knowledge about peak-finding parameters of a specific peak-finding algorithm, in accordance with various embodiments. Plots 610, 620, and 630 graphically depict three different integrations of the same chromatographic peak. Each of the plots includes a shading of the area integrated and a peak baseline.

From plots 610, 620, and 630, a user can more quickly select the correct integration. There is no iteration. The user simply visually inspects and compares the integrations (areas) of plots 610, 620, and 630. There is also no need to adjust any peak-finding parameter values. This has been done automatically. To select the correct integration and peak-finding parameter values, the user simply clicks on one of plots 610, 620, and 630.

For example, a comparison of plots 610, 620, and 630 shows that, in plot 620, peak baseline 621 excludes a small interfering peak 520 at the beginning of peak 510, but does not exclude the shoulder at the end of peak 510. As a result, plot 620 is likely to be selected by a user. In contrast, in plot 610, peak baseline 611 excludes the shoulder at the end of peak 510 in addition to the small interfering peak 520 at the beginning of peak 510. Like FIG. 5, in plot 630, peak baseline 631 does not exclude the small interfering peak 520 at the beginning of peak 510.

Figure 3:
FIG. 3 is an exemplary interactive table that is displayed to a user by a peak-finding algorithm and shows the peak-finding parameters used by the peak-finding algorithm to integrate a peak.
Figure 4:
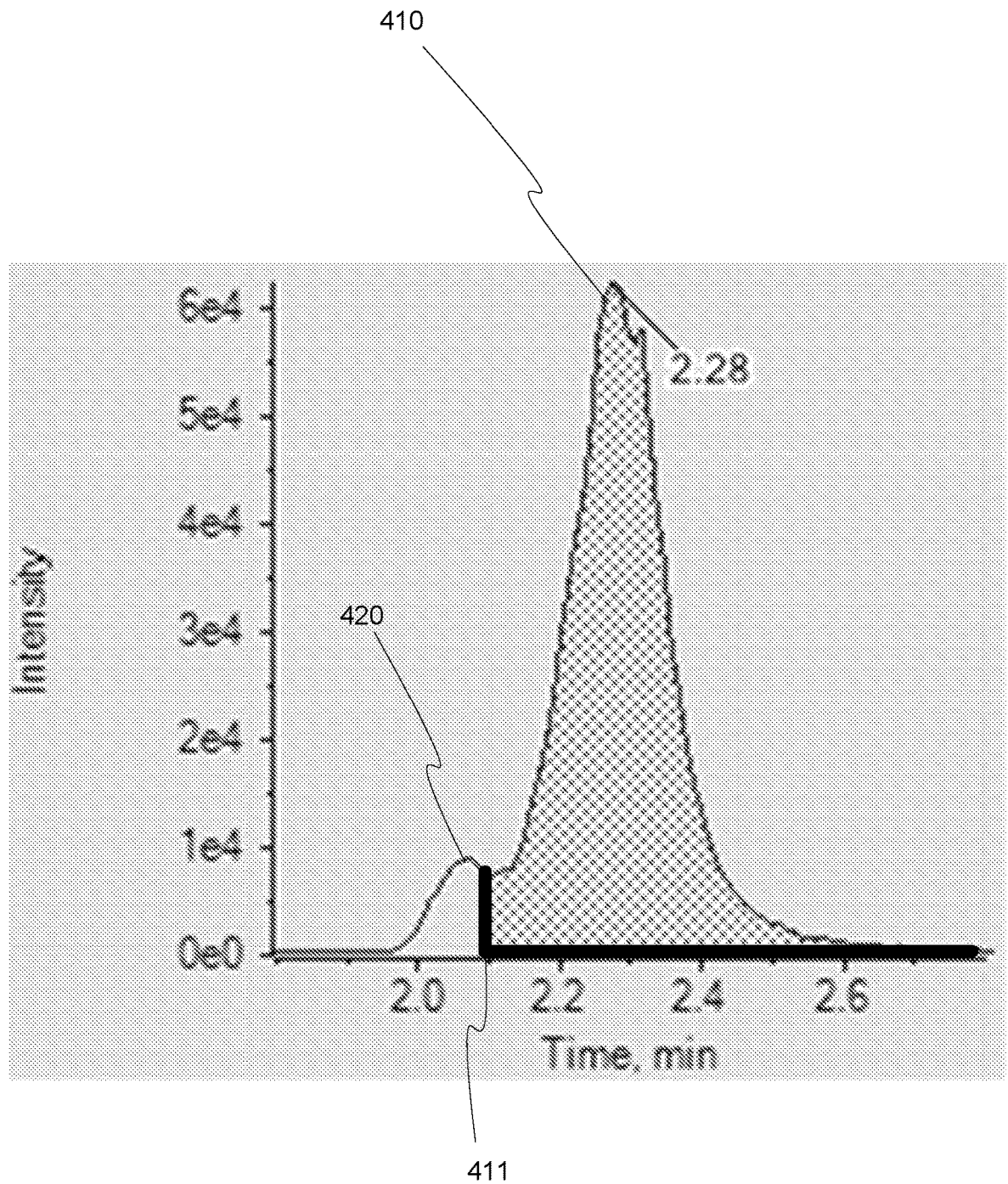
FIG. 4 is an exemplary plot of a chromatographic peak that is displayed to a user by a peak-finding algorithm and shows the correct integration of the chromatographic peak according the parameters of FIG. 3.

Conventionally, for example, a user is shown a table of peak-finding parameter values, like table 300 of FIG. 3 and a single plot of an integrated peak, like plot 500 of FIG. 5. The user then can iteratively change the peak-finding parameter values in the table and see a single updated plot of the re-integrated peak.

In contrast, in the various embodiments described herein, a single display of multiple plots of different integrations, like the display shown in FIG. 6 is presented to a user. The user can then click on a plot of an integration to select that integration and its values for the peak-finding parameters.

In various embodiments, multiple different possible peak integrations are provided when a user enters an "adjust integration mode." Also, in various embodiments, the multiple different possible peak integrations are determined in different ways.

In one embodiment, an administrator specifies the initial different peak-finding parameter values. As a result, two or more sets of initial different peak-finding parameter values are created by the administrator. This requires additional up-front administrator time, but is acceptable for an assay that is expected to be used for a long time or by less trained operators.

In another embodiment, values of one or more parameters are varied over their useful ranges and a representative value for each parameter is chosen for each significantly different result. One exemplary peak-finding parameter is the peak-splitting factor.

Figure 7:
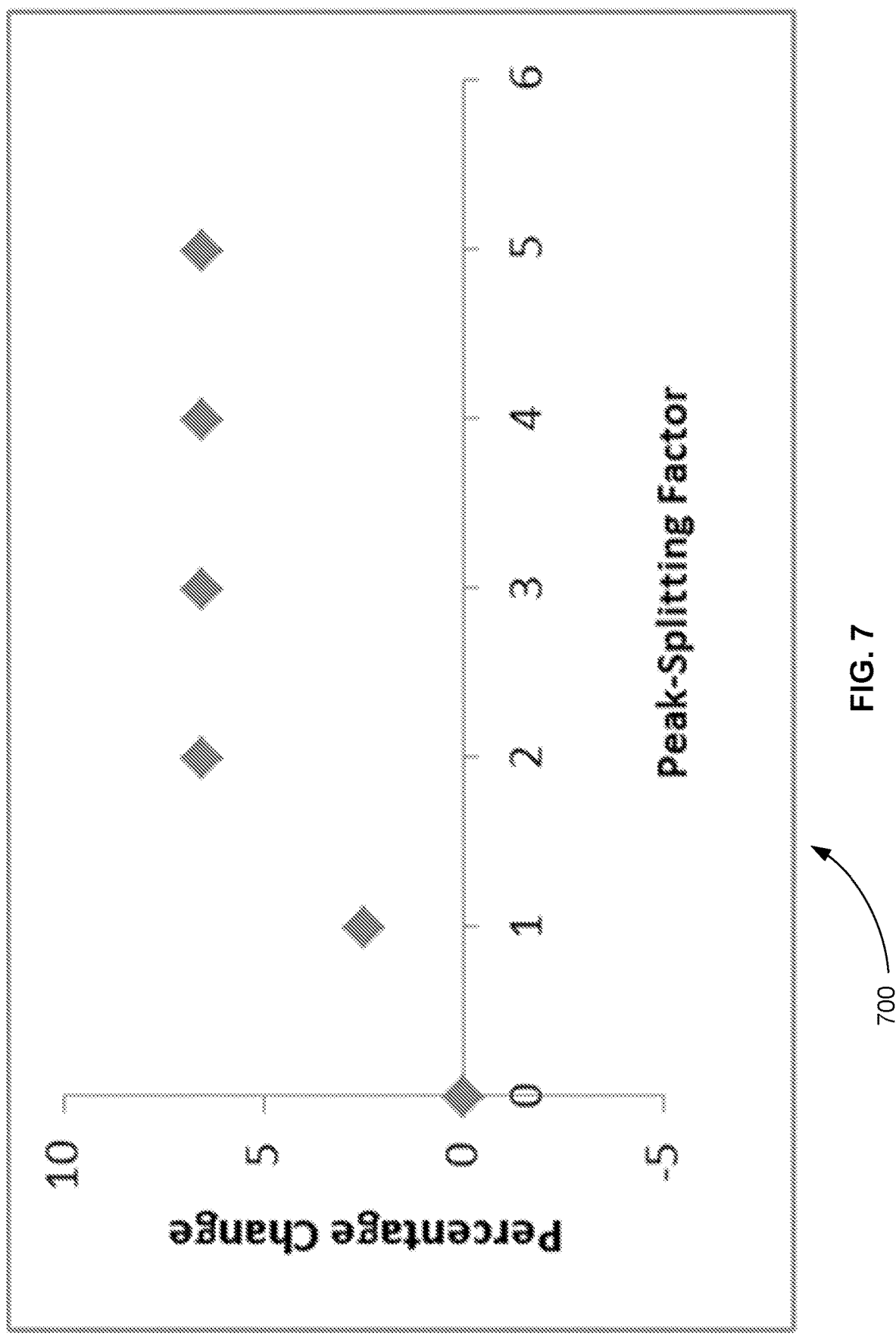
FIG. 7 is a plot of the percentage change in peak area as a function of the peak-splitting factor parameter, in accordance with various embodiments.

FIG. 7 is a plot 700 of the percentage change in peak area as a function of the peak-splitting factor parameter, in accordance with various embodiments. Plot 700 shows that there are only three different peak-splitting factor values that affect the percentage change in peak area. Note that there are only three different peak-splitting factor values that affect the percentage change in peak area within the range of the parameter which was investigated. The parameter was, however, varied over what was believed to be the most useful range.

All peak-splitting factor values beyond two provide the same percentage change in peak area as two. For most peak-finding algorithms, there are not a particularly large number of different possible values for the parameters. At least, there are not a large number for a computer to programmatically explore. The number could be "large" for manual exploration, however.

As a result, it is possible to nearly fully explore the parameter space. In various alternative embodiments, a "design for experiments" approach can be used to explore the space more efficiently. Under the design for experiments approach a subset of all possible parameter values is found and used. The subset can be chosen randomly or based on something known about the experiment.

In various embodiments, a combination of two or more peak-finding algorithm is used to find the multiple different integrations. For example, it is possible to combine what are fundamentally different peak-finding algorithms (such as MQ4 and AutoPeak from SCIEX) and to vary the respective parameters for each.

In various embodiments, the number of different (but still reasonable) peak integrations is kept small. Also, in various embodiments, it is possible—even for labs that do not allow fully manual integrations (i.e. baseline drawing)—to have the user draw a manual baseline and then automatically select the parameter set which most closely resembles that integration (or to allow the user to pick from the subset of the most similar integrations). Or, the selection can be iterative—users select a "close" integration in a first step and then a fine-tuned one in a second step.

In various embodiments, in a system at least partially aimed at experienced users, the values of the peak-finding parameters can still be displayed. When the user selects one of the possible integrations displayed, the values of the parameters change to reflect the selection. The display of the values of the parameters can still be interactive to allow users to adjust the parameters further manually.

In various alternative embodiment, the peak-finding parameters and their values are not displayed, at least during routine peak review. This is especially desirable in a cloud system with data review in a web browser since a simpler user interface (UI) is generally needed compared to a desktop system.

In general, the calculation of a number of possible peak integrations does not require a great deal of computer processing time. However, in various embodiments, if the calculations of possible peak integrations consume a large amount of computer processing time, the integrations can be pre-calculated and stored during initial creation of the results or done on-the-fly when the user chooses to change a particular integration.

In various embodiments, a high-quality integration algorithm is used first to minimize the number of peaks that need to be corrected. For example, AutoPeak has "smarter" shoulder detection than MQ4 and has a higher first-pass correct rate, so it can be used first.

Nonetheless, no peak-finding algorithm is—or is ever likely to be—perfect, so some manual correction is always required. Currently, once even a few peaks need to be corrected, users must understand the meaning of the different available parameters and how they are likely to change the integration. As mentioned above, the various embodiments described herein can eliminate the need for presenting parameters to the user and so allow less experienced users to obtain good results.

Most simply, the embodiments described herein lessen the time required for peak integration correction. If the integration parameters can be mostly removed from the peak review user interface, this means that users do not need to understand their meaning or use. This has an obvious cost saving for customers, but also directly alleviates user frustration with parameter adjustment. Also, as mentioned above, the embodiments described herein lessen the time required for manual peak re-integration.

Chromatographic Peak Integration System

Figure 8:
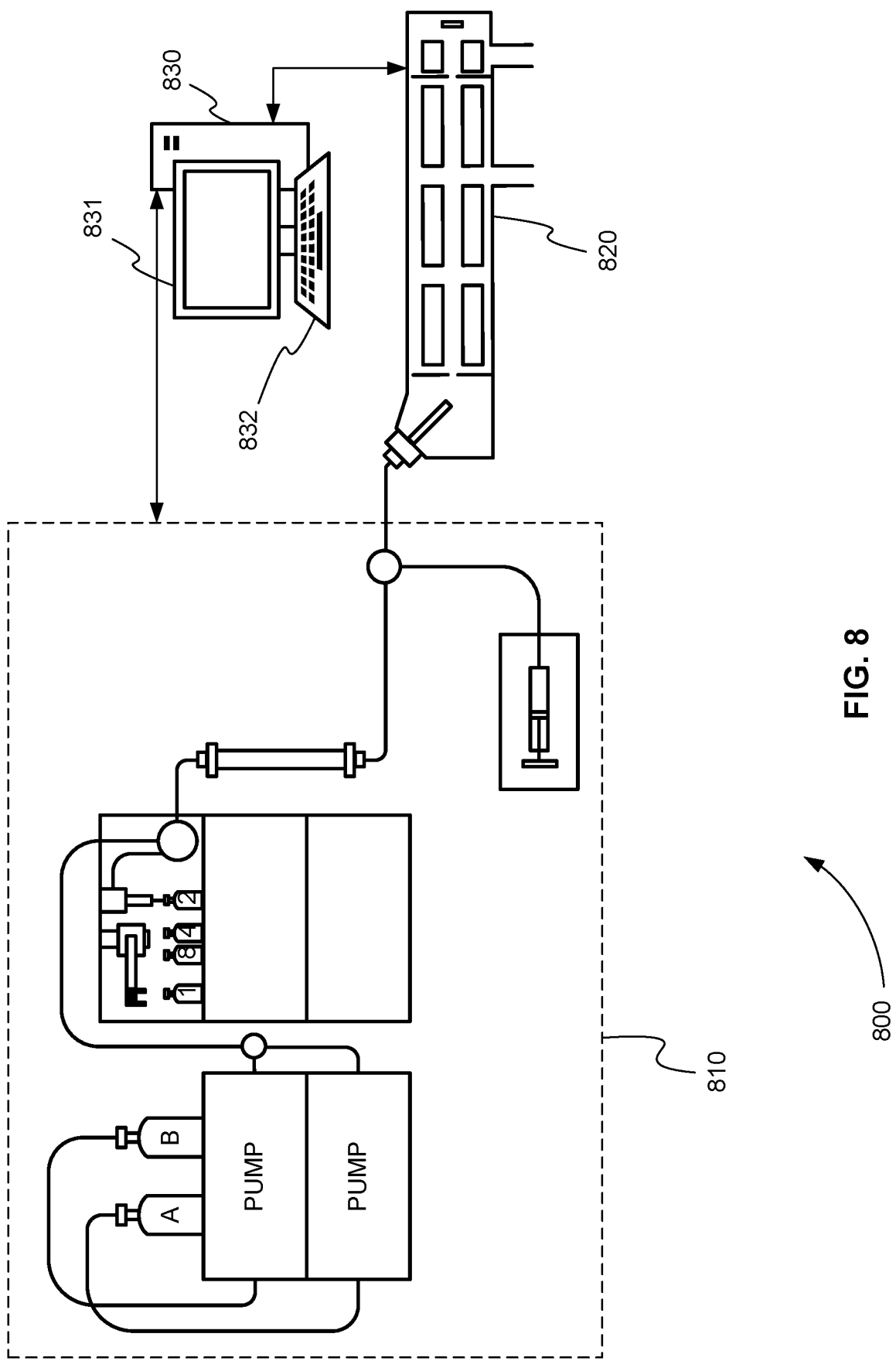
FIG. 8 is a schematic diagram of a system for selecting an integration area for a chromatographic peak, in accordance with various embodiments.

FIG. 8 is a schematic diagram 800 of a system for selecting an integration area for a chromatographic peak, in accordance with various embodiments. The system of FIG. 8 includes separation device 810, mass spectrometer 820, display device 831, user selection device 832, and processor 830.

Processor 830 is used to control, or provide instructions to, separation device 810 and mass spectrometer 820 and to analyze data collected from mass spectrometer 820. Processor 830 controls or provides instructions by, for example, controlling one or more voltage, current, or pressure sources (not shown). Processor 830 can be a separate device as shown in FIG. 8 or can be a processor or controller of separation device 810 or mass spectrometer 820. Processor 830 can be, but is not limited to, a controller, a computer, a microprocessor, the computer system of FIG. 1, or any device capable of sending and receiving control signals and data and capable of processing data.

Processor 830 instructs separation device 810 to separate a compound from a sample over a time period. Separation device 810 can be an HPLC system as shown in FIG. 8. In various alternative embodiments, separation device 810 can be any type of separation device for a mass spectrometer including, but not limited to, a liquid chromatography (LC) device, a gas chromatography device, a capillary electrophoresis device, or an ion mobility device.

Processor 830 instructs mass spectrometer 820 to measure a plurality of intensities of at least one ion of the separated compound over the time period, producing a chromatogram. Mass spectrometer 820 can be a quadrupole mass spectrometer as shown in FIG. 8. In various alternative embodiments, mass spectrometer 820 can be any type of a mass spectrometer including, but not limited to, a quadrupole or triple quadrupole (QqQ), an ion trap, an orbitrap, a time-of-flight (TOF) mass spectrometer, or a Fourier transform (FT) mass spectrometer.

Processor 830 identifies at least one peak of the at least one ion from the chromatogram using a peak-finding algorithm. Processor 830 calculates two or more different peak integration areas for the at least one peak also using the peak-finding algorithm by applying the peak-finding algorithm with two or more different values for at least one peak-finding parameter without manual and iterative adjustment of the two or more different values.

In various embodiments, processor 830 displays on display device 831 at the same time two or more plots of the at least one peak that each shows a different peak integration area of the two or more different peak integration areas graphically. Display device 831 can be a display of processor 830 as shown in FIG. 8. In various alternative embodiments, display device 831 can be the display of another processor or computer (not shown) including, but not limited to, a display of a processor or computer of separation device 810 or mass spectrometer 820.

In various embodiments, processor 830 receives data from user selection device 832 that indicates user selection of one of the two or more plots. User selection device 832 can be a keyboard of processor 830 as shown in FIG. 8. In various alternative embodiments, user selection device 832 can be a touchscreen of display device 831, a mouse, keypad, or any other type of input device of processor 830 or another processor or computer (not shown) including, but not limited to, a display of a processor or computer of separation device 810 or mass spectrometer 820.

In various embodiments, the two or more different values for the at least one peak-finding parameter that are used to calculate the two or more different peak integration areas are predetermined and received by processor 830. The two or more different values are determined by a system administrator and are input to processor 830 by the administrator.

In various alternative embodiments, the two or more different values are generated by processor 830. For example, the two or more different values for the at least one peak-finding parameter are generated to represent every different possible value within a selected range for the at least one peak-finding parameter.

Alternatively, the two or more different values for the at least one peak-finding parameter are generated to represent a subset of every different possible value within a selected range for the at least one peak-finding parameter. In various embodiments, the subset is found by calculating how the peak integration area changes as a function of the value of the at least one peak-finding parameter, selecting a peak integration area change threshold, and only including values of the at least one peak-finding parameter in the subset that change the peak integration area more than the peak integration area change threshold. FIG. 7, for example, shows the results from calculating how the peak integration area changes as a function of the value of the peak-splitting factor parameter. FIG. 7 shows that only three values of the peak-splitting factor parameter significantly change the peak integration area. As described above, there are only three values over the range analysed (which is presumed to be the useful range).

In various embodiments, in addition to selecting a peak integration area change threshold, some other output from the peak finder can be used. For example, the start or end of the peak can be used.

In various embodiments, the peak-finding algorithm used can be a combination of two or more peak-finding algorithms.

In various embodiments, processor 830 further calculates a numeric area value for each of the two or more different peak integration areas. Processor 830 then displays the calculated numeric area value with each of the two or more plots.

In various embodiments, each plot of the two or more plots shows a different peak integration area graphically by shading a different peak integration area and by displaying a different peak baseline.

In various embodiments, processor 830 further, from the selection of one of the two or more plots, determines a selected peak integration area of the two or more different peak integration areas. Processor 830 calculates a numeric area value for the selected peak integration area. Finally, processor 830 calculates a quantity of the compound in the sample from the numeric area value.

In various embodiments, processor 830 further displays on display device 831 with each of the two or more plots the at least one peak-finding parameter and the value used for the at least one peak-finding parameter. The value used for the at least one peak-finding parameter is editable, for example.

In various alternative embodiments, peak-finding parameters and peak finding parameters values are not displayed with the two or more plots.

Chromatographic Peak Integration Method

Figure 9:
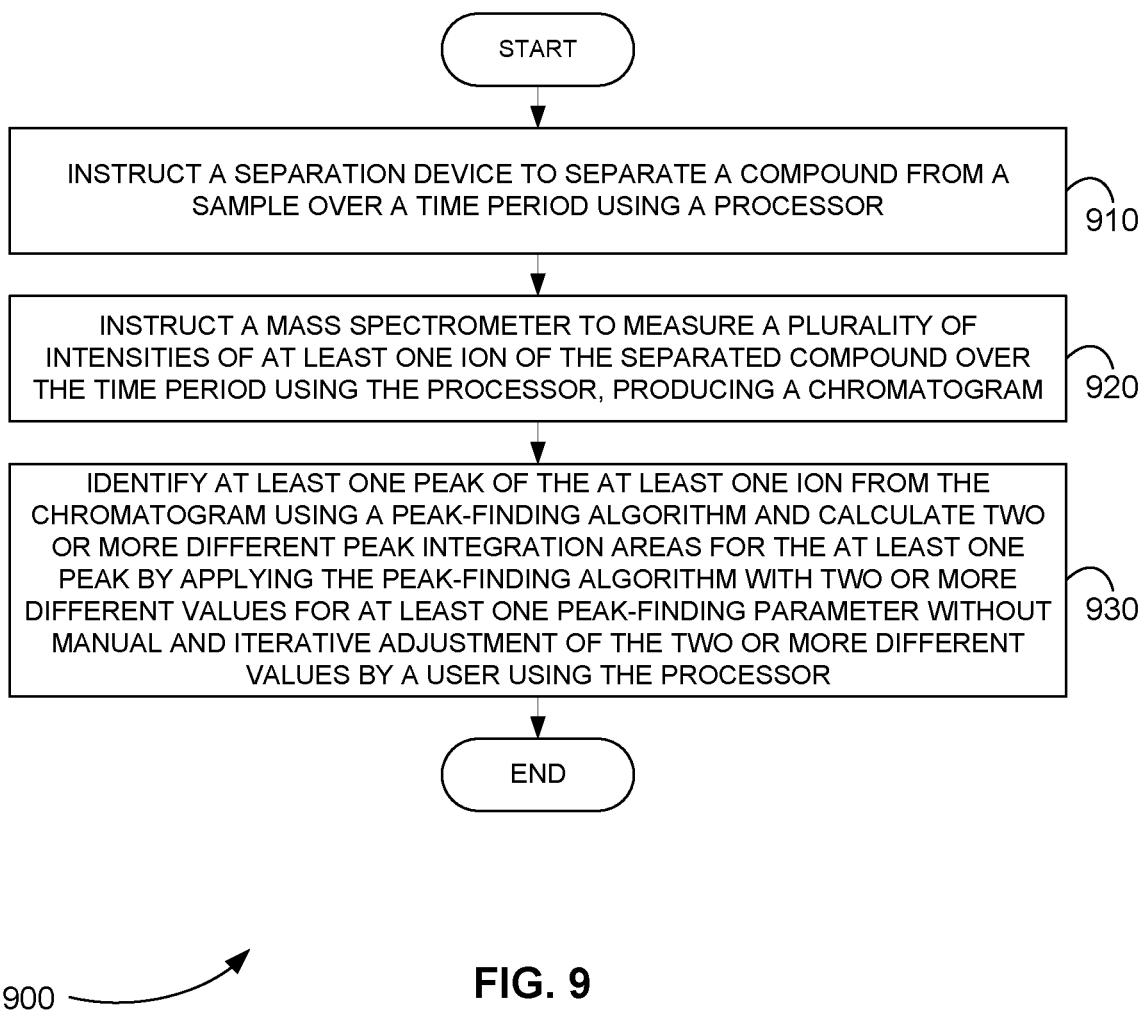
FIG. 9 is a flowchart showing a method for selecting an integration area for a chromatographic peak, in accordance with various embodiments.

FIG. 9 is a flowchart showing a method 900 for selecting an integration area for a chromatographic peak, in accordance with various embodiments.

In step 910 of method 900, a separation device is instructed to separate a compound from a sample over a time period using a processor.

In step 920, a mass spectrometer is instructed to measure a plurality of intensities of at least one ion of the separated compound over the time period using the processor, producing a chromatogram.

In step 930, at least one peak of the at least one ion is identified from the chromatogram using a peak-finding algorithm and two or more different peak integration areas are calculated for the at least one peak by applying the peak-finding algorithm with two or more different values for at least one peak-finding parameter without manual and iterative adjustment of the two or more different values using the processor.

In various embodiments, two or more plots of the at least one peak that each shows a different peak integration area of the two or more different peak integration areas graphically are displayed on a display device at the same time using the processor.

In various embodiments, data is received from a user selection device that indicates user selection of one of the two or more plots using the processor.

Chromatographic Peak Integration Computer Program Product

In various embodiments, computer program products include a tangible computer-readable storage medium whose contents include a program with instructions being executed on a processor so as to perform a method for selecting an integration area for a chromatographic peak. This method is performed by a system that includes one or more distinct software modules.

Figure 10:
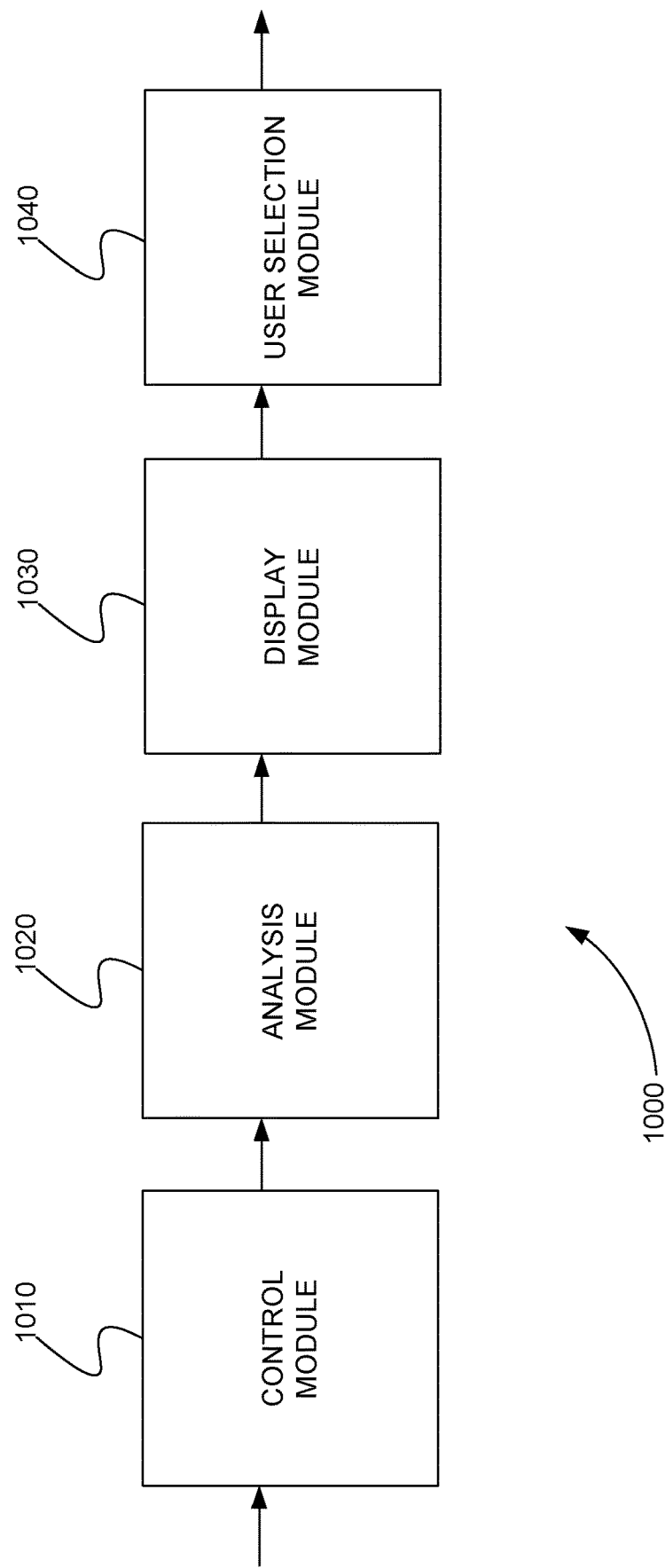
FIG. 10 is a schematic diagram of a system that includes one or more distinct software modules that perform a method for selecting an integration area for a chromatographic peak, in accordance with various embodiments.

FIG. 10 is a schematic diagram of a system 1000 that includes one or more distinct software modules that perform a method for selecting an integration area for a chromatographic peak, in accordance with various embodiments. System 1000 includes control module 1010 and analysis module 1020.

Control module 1010 instructs a separation device to separate a compound from a sample over a time period. Control module 1010 instructs a mass spectrometer to measure a plurality of intensities of at least one ion of the separated compound over the time period, producing a chromatogram.

Analysis module 1020 identifies at least one peak of the at least one ion from the chromatogram using a peak-finding algorithm. Analysis module 1020 calculates two or more different peak integration areas for the at least one peak by applying the peak-finding algorithm with two or more different values for at least one peak-finding parameter without manual and iterative adjustment of the two or more different values.

In various embodiments, system 1000 further includes display module 1030 and user selection module 1040. Display module 1030 displays on a display device at the same time two or more plots of the at least one peak that each shows a different peak integration area of the two or more different peak integration areas graphically. User selection module 1040 receives data from a user selection device that indicates user selection of one of the two or more plots.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for selecting an integration area for a chromatographic peak, comprising:
   a separation device;
   a mass spectrometer;
   a display device;
   a user selection device; and
   a processor that
      instructs the separation device to separate a compound from a sample over a time period,
      instructs the mass spectrometer to measure a plurality of intensities of at least one ion of the separated compound over the time period, producing a chromatogram,
      identifies at least one peak of the at least one ion from the chromatogram using a peak-finding algorithm and calculates two or more different peak integration areas for the at least one peak by applying the peak-finding algorithm with two or more different values for at least one peak-finding parameter without manual and iterative adjustment of the two or more different values by a user,
      displays on the display device at the same time two or more plots of the at least one peak that each shows a different peak integration area of the two or more different peak integration areas graphically, and receives data from the user selection device that indicates user selection of one of the two or more plot.

2. The system of claim 1, wherein the two or more different values for the at least one peak-finding parameter are predetermined and received by the processor.

3. The system of claim 1, wherein the two or more different values for the at least one peak-finding parameter are generated by the processor.

4. The system of claim 3, wherein the two or more different values for the at least one peak-finding parameter generated represent every different possible value within a selected range for the at least one peak-finding parameter.

5. The system of claim 3, wherein the two or more different values for the at least one peak-finding parameter generated represent a subset of every different possible value within a selected range for the at least one peak-finding parameter.

6. The system of claim 5, wherein the subset is found by calculating how the peak integration area changes as a function of the value of the at least one peak-finding parameter, selecting a peak integration area change threshold, and only including values of the at least one peak-finding parameter in the subset that change the peak integration area more than the peak integration area change threshold.

7. The system of claim 1, wherein the processor further calculates a numeric area value for each of the two or more different peak integration areas and the processor displays a calculated numeric area value with each of the two or more plots.

8. The system of claim 1, wherein each plot of the two or more plots shows a different peak integration area graphically by shading a different peak integration area and by displaying a different peak baseline.

9. The system of claim 1, wherein the processor further from the selection of one of the two or more plots determines a selected peak integration area of the two or more different peak integration areas, calculates a numeric area value for the selected peak integration area, and calculates a quantity of the compound in the sample from the numeric area value.

10. The system of claim 1, wherein the processor further displays on the display device with each of the two or more plots the at least one peak-finding parameter and a value used for the at least one peak-finding parameter.

11. A method for selecting an integration area for a chromatographic peak, comprising:
instructing a separation device to separate a compound from a sample over a time period using a processor;
instructing a mass spectrometer to measure a plurality of intensities of at least one ion of the separated compound over the time period using the processor, producing a chromatogram;
identifying at least one peak of the at least one ion from the chromatogram using a peak-finding algorithm and calculating two or more different peak integration areas for the at least one peak by applying the peak-finding algorithm with two or more different values for at least one peak-finding parameter without manual and iterative adjustment of the two or more different values by a user using the processor;
displaying on a display device at the same time two or more plots of the at least one peak that each shows a different peak integration area of the two or more different peak integration areas graphically using the processor and
receiving data from a user selection device that indicates user selection of one of the two or more plots using the processor.

12. A computer program product, comprising a non-transitory and tangible computer-readable storage medium whose contents include a program with instructions being executed on a processor to perform a method for selecting an integration area for a chromatographic peak, the method comprising:
providing a system, wherein the system comprises one or more distinct software modules, and wherein the distinct software modules comprise a control module and an analysis module;
instructing a separation device to separate a compound from a sample over a time period using the control module;
instructing a mass spectrometer to measure a plurality of intensities of at least one ion of the separated compound over the time period using the control module, producing a chromatogram; and
identifying at least one peak of the at least one ion from the chromatogram using a peak-finding algorithm and calculating two or more different peak integration areas for the at least one peak by applying the peak-finding algorithm with two or more different values for at least one peak-finding parameter without manual and iterative adjustment of the two or more different values by a user using the analysis module,
displaying on a display device at the same time two or more plots of the at least one peak that each shows a different peak integration area of the two or more different peak integration areas graphically using the display module; and
receiving data from a user selection device that indicates user selection of one of the two or more plots using the user selection module.

13. The computer program product of claim 12, wherein the distinct software modules further comprise a display module and a user selection module and wherein the method further comprises
displaying on a display device at the same time two or more plots of the at least one peak that each shows a different peak integration area of the two or more different peak integration areas graphically using the display module and
receiving data from a user selection device that indicates user selection of one of the two or more plots using the user selection module.

* * * * *